(12) United States Patent
Mitchell

(10) Patent No.: US 7,840,220 B1
(45) Date of Patent: Nov. 23, 2010

(54) VARIABLE RATE FORWARD ERROR CORRECTION REGULATION SYSTEM AND METHOD BASED ON POSITION LOCATION INFORMATION

(75) Inventor: James P. Mitchell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 988 days.

(21) Appl. No.: 10/937,686

(22) Filed: Sep. 9, 2004

(51) Int. Cl.
*H04W 72/00* (2009.01)
*H04W 24/00* (2009.01)
*H04B 7/00* (2006.01)
*H04B 1/00* (2006.01)

(52) U.S. Cl. ............... 455/452.2; 455/522; 455/69; 455/456.1

(58) Field of Classification Search ............ 455/452.2, 455/522, 69, 456.1
See application file for complete search history.

(56) References Cited

U.S. PATENT DOCUMENTS

| | | | |
|---|---|---|---|
| 5,311,553 A * | 5/1994 | Chennakeshu et al. ...... 375/265 |
| 5,960,355 A * | 9/1999 | Ekman et al. ............ 455/456.1 |
| 5,990,826 A | 11/1999 | Mitchell |
| 6,141,534 A * | 10/2000 | Snell et al. ............... 455/12.1 |
| 6,170,075 B1 * | 1/2001 | Schuster et al. ............ 714/776 |
| 6,188,353 B1 | 2/2001 | Mitchell |
| 6,188,905 B1 * | 2/2001 | Rudrapatna et al. ....... 455/452.2 |
| 6,208,663 B1 * | 3/2001 | Schramm et al. ............ 370/465 |
| 6,385,454 B1 * | 5/2002 | Bahl et al. ................. 455/450 |
| 6,529,706 B1 | 3/2003 | Mitchell |
| 6,529,730 B1 * | 3/2003 | Komaili et al. .......... 455/452.2 |
| 6,750,813 B2 * | 6/2004 | Vargas-Hurlston et al. ...... 342/357.09 |
| 6,965,770 B2 * | 11/2005 | Walsh et al. ............. 455/426.1 |
| 7,088,683 B2 * | 8/2006 | Sawada et al. ............. 370/252 |
| 7,333,774 B2 * | 2/2008 | Banerjee et al. .......... 455/67.11 |

OTHER PUBLICATIONS

Patent Application for "A Public Safety Communications Network Using Asymmetric Receive/Transmit Channels" by James P. Mitchell, filed herewith.
Patent Application for "System and Method for Real Time Textual Data Compression and Textual Data Manipulation Using Unique Numerical Identification of Entire Words" by James P. Mitchell, U.S. Appl. No. 09/660,013, filed Sep. 12, 2000.

(Continued)

*Primary Examiner*—Vincent P Harper
*Assistant Examiner*—Marisol Figueroa
(74) *Attorney, Agent, or Firm*—Matthew J. Evans; Daniel M. Barbieri

(57) ABSTRACT

A communications system utilizes a forward error correction (FEC) regulation system in transmitting data to a mobile client. The FEC strength is regulated as a function of a mobile client location and channel statistics for the location. The communications system includes a server for providing the FEC, a channel statistics database for storing channel data for locations of the mobile client, and a map database. The FEC strength is based on mobile client position and channel performance statistics measured by the mobile client over a period of time and sent to the server or optionally on previously collected and stored channel statistics measurements for the mobile client position or predicted position. The collection of channel statistics is made with an automated system to create a channel statistics measurement database. The FEC strength is varied by modifying packet payload redundancy, packet time spreading, interleave characteristics and error coding rates.

11 Claims, 3 Drawing Sheets

OTHER PUBLICATIONS

Patent Application for "System and Method for Compression of Words and Phrases in Text Based on Language Features" by James P. Mitchell, Serial No. 824,923, filed Apr. 15, 2004.
Triveni Digital brochure for "SkyScraper Data Broadcast System for Digital Television", 2004.
"Data Transmission Efficiency" Harmonic Inc. White Paper, Feb. 24, 2003.
"Broadcast and Multicast Services in Mobile Networks", by K. Ahmavaara et al., XVIII World Telecommunications Congress 2002, Paris, France Sep. 22-27, 2002.
"IP Datacast in a Teracom DVB-T Network in Stockholm" Teracom White Paper, Jul. 2002.
"What Exactly is 8-VSB Anyway" paper by David Sparano, Harris Corp., first version 1997.

* cited by examiner

VARIABLE RATE FORWARD ERROR CORRECTION REGULATION SYSTEM AND METHOD BASED ON POSITION LOCATION INFORMATION

CROSS REFERENCE TO RELATED APPLICATIONS

The present application is related to application 10/937,648 filed herewith entitled "A Public Safety Communications Network Using Asymmetric Receive/Transmit Channels" by James P. Mitchell. The co-filed application is incorporated by reference in its entirety and is assigned to the assignee of the present invention.

BACKGROUND OF THE INVENTION

The present invention relates to communications networks, asymmetrical communications networks, and specifically to a forward error correction (FEC) regulation system and method that offers increased performance by using variable rate (FEC) based on position location information. The FEC regulation system is applicable to public safety communications, Home Land Defense (HLD) communications, military communications, and other communications applications.

The co-filed application is for a public safety and homeland defense communications system using asymmetric receive and transmit channels. The system is an asymmetrical hybrid communications system using digital television (DTV) assets such as the Public Television (PTV) network for delivering wide bandwidth data and a land mobile radio system (LMRS) for receiving narrow bandwidth requests for the wide bandwidth data from a mobile client. The asymmetric communications system has the ability to efficiently provide data broadcasts, Amber alerts, graphics, and video transmission and retrieval to the mobile client. The mobile client may be any vehicular system or any system for a person on foot.

Currently there are very few if any practical options for realtime forward error correction (FEC) rate control in the asymmetric public safety communications network using a DTV system to broadcast to the mobile client and LMRS to receive messages from the mobile client. Continuous DTV channel measurements may be reported using the LMRS. However it is highly undesirable to use a valuable and many times congested LMRS as a continuous or periodic connection for reporting the DTV channel conditions or as a frequent ARQ (automatic retransmission request) channel. Land mobile radio bands are a scarce commodity and must remain open for vital voice communications. Thus there is a need for providing reception quality data feedback on the DTV broadcast channel without placing an undue traffic burden on the LMRS.

Additionally for reporting channel conditions the narrowband back channel LMRS contains a significant amount of network latency by design. This poses a problem for a system that uses interleave techniques under mobile conditions in urban canyons as an example. With current FEC methods, there is no provision to provide a mobile client vehicle dynamic FEC needs as it moves about. A mobile client may be headed for an area having high LOS (line-of-sight) blockage conditions. With current day methods, the signal becomes blocked or compromised first and this information is fed back to a transmitter. FEC adjustments are reactive in this case and can result in high channel inefficiency and poor performance particularly if the feedback channel is relatively slow. In this case the signal may become blocked or attenuated and new interleave and data payload redundancy is desired. However in the asymmetric communications system case, the LMRS may take tens of seconds at best to inform the DTV system to use a stronger redundancy and interleave time period for example but this is too slow and not enough benefit to justify constant LMRS use as the mobile client moves about. This is inefficient use of both the DTV and LMRS channels. FEC rates need to be regulated or controlled in a more predictive improved realtime manner for terrestrial asymmetric DTV/LMRS systems in order to make efficient use of the channel while maintaining a robust link.

There is a need to regulate or control FEC rates in a more real-time manner for terrestrial asymmetric DTV/LMRS systems and other communications systems in order to make efficient use of the channel while maintaining a robust communications link.

SUMMARY OF THE INVENTION

A communications network with asymmetric channels receives requests for data from a mobile client over a narrowband channel and delivers wideband data over a wideband channel to the mobile client. The communications network utilizes a forward error correction (FEC) regulation system when delivering the wideband data to the mobile client. The communications network comprises a land mobile radio system (LMRS) for providing the narrowband channel for requesting the data. A digital television (DTV) network is connected to the LMRS to provide the wideband channel for delivering the requested data over the wideband channel. A server is connected to the LMRS and the DTV network for providing the forward error correction (FEC) regulation system to regulate FEC strength for the requested data. The FEC strength is regulated as a function of a mobile client location and channel statistics for the mobile client location.

The communications network further comprises a map database connected to the server that contains location data for the mobile client location. A channel statistics database is connected to the server for storing channel performance statistics for the mobile client location.

The communications network FEC strength is based on mobile client position or predicted position and historical channel performance statistics measured by the mobile client over a period of time and sent to the server with data requests. The FEC strength may be based on mobile client position or predicted position and channel performance statistics previously collected and stored in a channel statistics measurement database for the mobile client position or predicted position.

The map database and a predictive algorithm are used in identifying likelihood estimations of future paths of a route of the mobile client to determine the FEC strength. The FEC strength is dynamically constructed based on mobility of the mobile client. The request for data from the mobile client includes mobility parameters such as GPS position, speed, and time to construct FEC strength. The FEC strength is higher while the mobile client is moving and minimal while the mobile client is approximately stationary.

The server schedules in advance updated FEC strength for subsequent data payloads for anticipated position location of the mobile client as the mobile client moves.

The fade conditions are predicted based on the mobile client position, apparent or planned direction, and speed while on a particular road based on what comes next in the channel statistics database while going in a certain direction on the road.

The channel statistics over a geographic region are collected with an automated system incorporated in the mobile client to create the channel statistics measurement database.

The server in association with the DTV network transmits data sequences or random information to assess BER from data collected from mobile client with the automated system. The channel statistics measurement database is maintained at the server and is optionally updated by the mobile client as it calls in. The mobile client accumulates historical RF fade and BER statistics based on position to improve the channel statistics measurement database over time.

In the communications network the FEC strength may be varied by modifying packet payload redundancy, by modifying packet time spreading, and by modifying interleave characteristics. The FEC strength may be varied by changing an error coding rate to match the channel condition and to conserve channel bandwidth. The variable FEC strength may be related to seasonal foliage condition estimates and estimated conditions of wet foliage based on regional rain fall and evaporation rates.

The location of the mobile client is determined through GPS or augmented geolocation reporting.

It is an object of the present invention to provide a communications network using asymmetric channels and using a variable rate forward error correction regulation system for receiving requests for data from a mobile client over a narrowband channel and delivering wideband data over a wideband channel to the mobile client.

It is an object of the present invention to provide a unique forward error correction technique to improve mobile signal quality.

It is an object of the present invention to provide a real-time FEC rate control for an asymmetric communications system.

It is an advantage of the present invention to provide an innovative FEC control method that is based on prior knowledge of what the channel statistics are probably like in a geographic area.

It is an advantage of the present invention to enable a pro-active FEC channel adjustment according to mobile clients' position and anticipated path as predicted by GPS, kinematic algorithms and roadway databases.

It is a feature of the present invention to provide to provide high reliability and redundancy for data communications.

It is a feature of the present invention to not rely on a slow and expensive LMRS channel.

BRIEF DESCRIPTION OF THE DRAWINGS

The invention may be more fully understood by reading the following description of the preferred embodiments of the invention in conjunction with the appended drawings wherein.

DETAILED DESCRIPTION

The invention described herein is for a unique variable rate forward error correction (FEC) regulation system and method for use in communications systems such as a public safety communications network for transmitting to a mobile client vehicle. The FEC regulation system function is based on prior knowledge of what channel statistics are probably like in a particular geographic area. Rather than relying on slow and expensive return channels a proactive FEC channel adjustment is made according to the mobile client position and anticipated path as determined by GPS, kinematic algorithms, and map and channel statistic databases. The FEC regulation system may be used with an asymmetric radio communications system using a digital television (DTV) system and a land mobile radio system (LMRS) and alternatively other radio system combinations may be used such as cellular and satellite.

Figure 1:
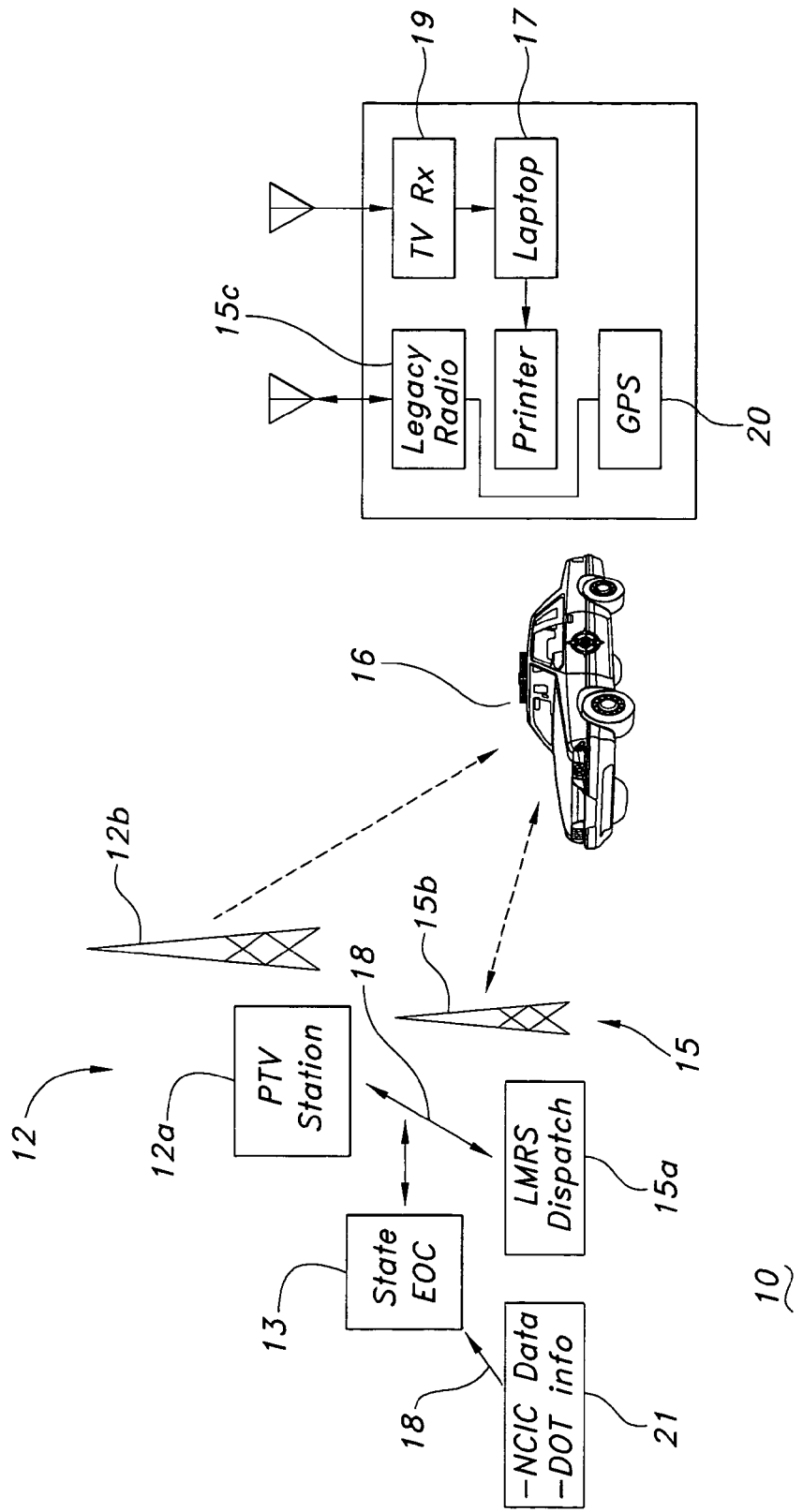
FIG. 1 is a block diagram of the public safety communications network using asymmetric receive/transmit channels and the forward error correction regulation system of the present invention showing details of mobile client equipment.

FIG. 1 is a block diagram of a public safety communications network 10 using asymmetric receive/transmit channels showing details of mobile client vehicle 16 equipment. The public safety communications network 10 may incorporate the forward error correction regulation system of the present invention and is used as exemplary system for description and implementation of the present invention in a communications system. The public safety communications network 10 comprises a Public Television (PTV) network 12 or other digital television (DTV) network that includes a DTV station 12a and antenna 12b; a land mobile radio system (LMRS) 15 comprising a LMRS dispatch center 15a, a repeater/antenna 15b, a legacy mobile radio 15c in vehicle 16, and handheld radios (not shown); and optionally an emergency operations center (EOC) 13. The PTV network 12, the LMRS 15, and the EOC 13 are all interconnected with a wide area network (WAN) 18 that may be a wireless datalink, a fiberoptic data link, or some other high-speed data link. Each vehicle 16 is equipped with a laptop computer 17 that manages and displays data received from the PTV network 12 over a DTV datacast receiver 19. The DTV datacast receiver 19 is an addition to the LMRS equipment normally installed in vehicle 16. The public safety communications network 10 enables reuse of the existing LMRS 15, GPS receiver 20, and computer terminal 17 in the vehicle 16 as interface terminals.

Figure 2:
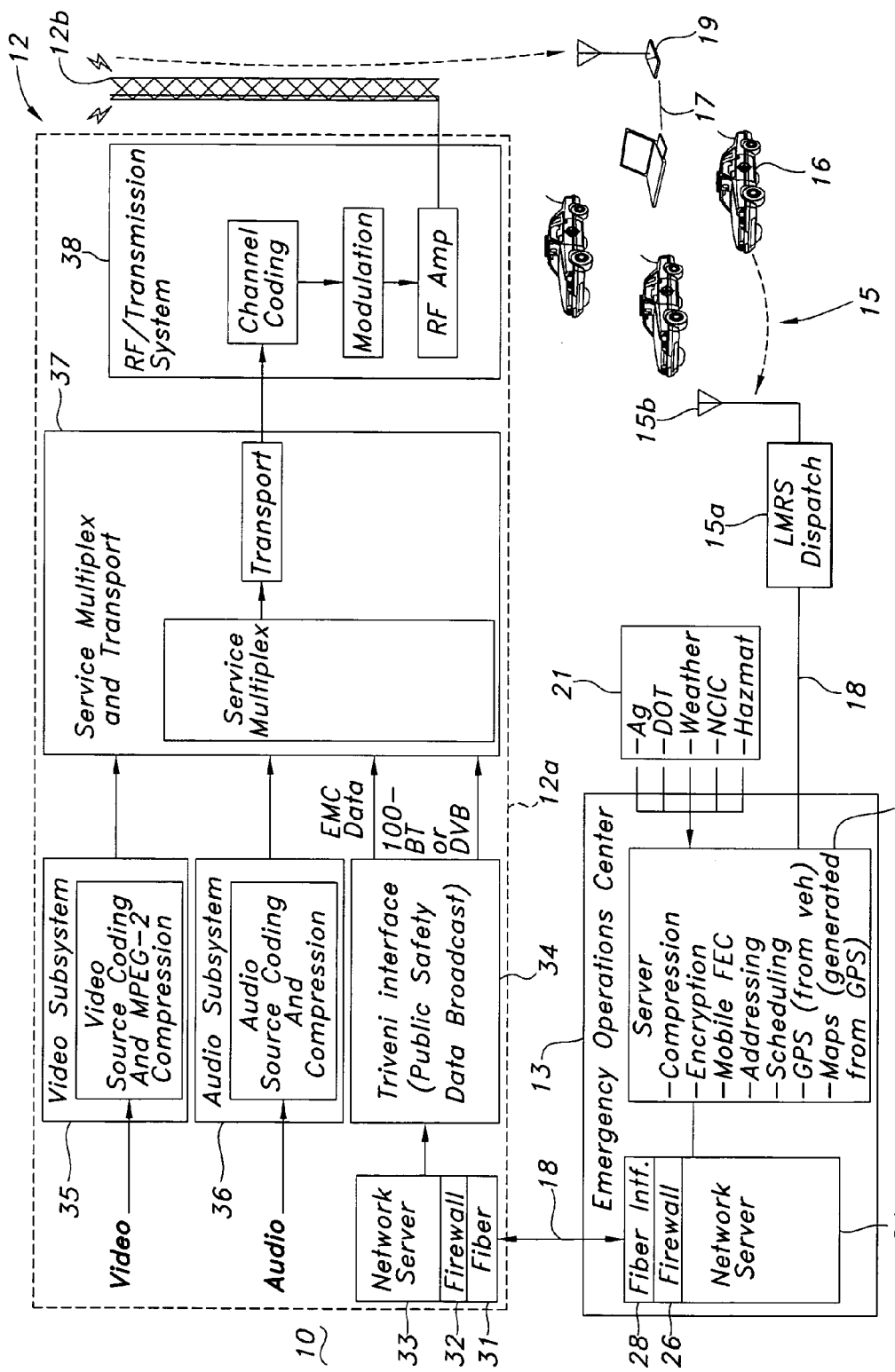
FIG. 2 shows the public safety communications network using asymmetric receive/transmit channels and the forward error correction regulation system of the present invention with details of an emergency operations center and a digital television station.

In operation of the asymmetrical public safety communications system 10, a request for data is sent over the LMRS 15 from a mobile client requestor in the vehicle 16 using the legacy LMRS radio 15c, received by the antenna 15b, and the LMRS dispatch 15a. The request may originate from a mobile client other than a vehicle 16 when the mobile client is similarly equipped. The request is authenticated and vectored to the EOC 13. Databases 21 are connected to the EOC 13 to provide and forward the requested data over the wide area network 18. At the EOC 13, the data is processed and delivered to the DTV station 12a. Alternately the request may be forwarded from the LMRS dispatch 15a directly to the DTV station 12a when the LMRS dispatch 15a or the DTV station 12a have the capabilities of the EOC 13 thereby bypassing or eliminating the EOC 13. At the DTV station 12a the data is delivered to a data multiplex insertion system (shown in FIG. 2 as item 34) for transmission over the antenna 12b to the vehicle 16. The mobile client requestor of the data is notified of return data on the laptop 17 that is connected to the DTV datacast receiver 19 located in the vehicle 16.

The public safety communications network 10 using asymmetric receive/transmit channels is shown in FIG. 1with additional details of the EOC 13 and the DTV station 12a. The EOC 13 is connected to the LMRS 15 through the WAN 18 and to the databases 21 such as Department of Agriculture, Department of Transportation (DOT), weather, National Crime Information Center (NCIC), Hazmat, and any others needed for public safety and HDL applications through a database management system with databases located at each agency and a central management systems at the EOC 13. The data from these databases 21 may be compressed (text and graphical) in advance of transmission using compression methods disclosed in co-pending applications Ser. No. 09/660,013 "System and Method for Real Time Textual Data Compression and Textual Data Manipulation Using Unique Numerical Identification of Entire Words" by James P. Mitchell and Ser. No. 10/824,923 "System and Method for Compression of Words and Phrases in Text Based on Language Features" by James P. Mitchell. The co-pending applications are assigned to the assignee of the present invention.

The databases 21 and LMRS dispatch 15*a* are connected to a server 22 that provides real time data compression, encryption, and the forward error correction for the data from the databases 21 for delivery to the mobile client 16. A real-time video encoder (not shown) such as a V-Brick VBXcast provides MPEG-4 conversion of analog video.

The EOC 13 further comprises a network server 24 that performs network management functions such as client authentication and query of agency databases. The network server 24 is connected to a firewall 26 for system protection and a fiberoptic interface 28 to interface the WAN 18 or other types of data communications networks as needed.

The DTV station 12*a* comprises a fiberoptic interface 31 to interface a fiberoptic WAN 18 or other types of networks as needed. A firewall 32 may be provided for system protection. The data from the WAN 18 is passed to a DTV network server 33. The DTV network server 33 prepares and schedules data for broadcast. This process can include forward error correction (FEC) at the source code level, time interleave, and redundancy prescribed according to the mobile client 16 position and as correlated to a database linking position to a recommended FEC or error control method. The DTV network server 33 is connected to a data multiplex insertion system 34 such as one provided by Triveni to support a 2- to 4-Mbps data transmission capability for public safety data. The data multiplex insertion system 34 inserts public safety data requested from the mobile client vehicle 16 and received from the EOC 13 into a service multiplex and transport function 37 along with video data from a video subsystem 35 and audio data from an audio subsystem 36. Audio subsystem 36 and video subsystem 35 source code and compress the normal DTV data as part of the normal DTV function. The service multiplex and transport function 37 multiplexes the public safety data and the audio and video data and transports the multiplexed data to a RF/transmission system 38. In the RF/transmission system 38 channel coding, modulation, and amplification take place before a HDTV signal is sent to the antenna 12*b* for transmission to the mobile client vehicle 16 making the request along with a normal DTV signal.

The DTV datacast receiver 19 in the vehicle 16 is a broadband receiver such as one manufactured by BroadBand Tech Inc. for receiving DTV datacast messages. The DTV datacast receiver 19 includes application software enabling review or redistribution of information received including graphics, text, video and sound. The DTV datacast receiver 19 performs decryption of information, decompression of data, printer and video display, and electronic recording in memory for evidence courtroom use.

The unique variable rate forward error correction (FEC) regulation system of the present invention may be used in the public safety network 10 in transmitting requested data to the mobile client vehicle 16. The forward error correction (FEC) algorithm may be implemented in the server 22 and is applied to data transmitted to mobile clients 16. Alternately the EOC 13 may be eliminated and the FEC regulation function may be implemented at the DTV station 12*a* in the network server 33 for example.

The FEC regulation system is based on prior knowledge of what the channel statistics are probably like in a geographic area. Rather than relying on slow and expensive return channels such as the LMRS 15, a proactive FEC channel adjustment is made according to the mobile client vehicle 16 position and anticipated path as determined by GPS, kinematic algorithms, and map and channel statistic databases. The FEC regulation system makes use of the asymmetric radio communications system 10 using the DTV system 12 and LMRS 15 and alternatively other radio system combinations may be used such as cellular and satellite.

In the FEC regulation system a predictive algorithm is used to arrive at a FEC based on vehicle 16 position or predicted position and historical bit-error-rate (BER) data or other channel performance statistic measured by the vehicle 16 over a period of time. Optionally a table that cross-references vehicle 16 position or predicted position with a previously surveyed or measured BER or other channel performance statistic for the position, urban or rural may be used to arrive at a FEC strength.

In the FEC regulation system, a map database and the predictive algorithm are used to generate an FEC method and strength for the mobile client 16 in a geographic location as a function of historical BER data stored in a channel statistics database at the EOC 13 when the EOC 13 is used or at the DTV transmitter 12*a*. A record of signal strength, multipath, and BER is accumulated historically for a period of time in the vehicle 16, giving probable or predictive indication as to what the future might have in terms of propagation. The historical bit-error-rate data accumulated in the vehicle 16 is sent to the EOC 13 during a mobile data request from the vehicle 16 to formulate a FEC, coding or redundancy method, transmission repetition, and time interleave period. The map database and the predictive algorithm are used in identifying likelihood estimations of future paths of the mobile client's route. An assigned FEC method and strength is used with a data payload for broadcast over the DTV broadcast network 12 to the mobile client 16. For example, in geographical areas having occasional signal blockage such as hills or in rural areas a long data interleave might be selected, whereas in a city where there are high RF fade densities a high rate block code may also be selected for the FEC in addition to an interleave. The FEC is selected based on the vehicle 16 geolocation and speed.

The map database may be a GIS (Geographic Information System) database used by a variety of public and private agencies to store and manipulate data about specific locations in a certain area. A geographic area such as a city has a digitized base map with known boundaries, landmarks, etc. stored in the GIS map database.

Figure 3:
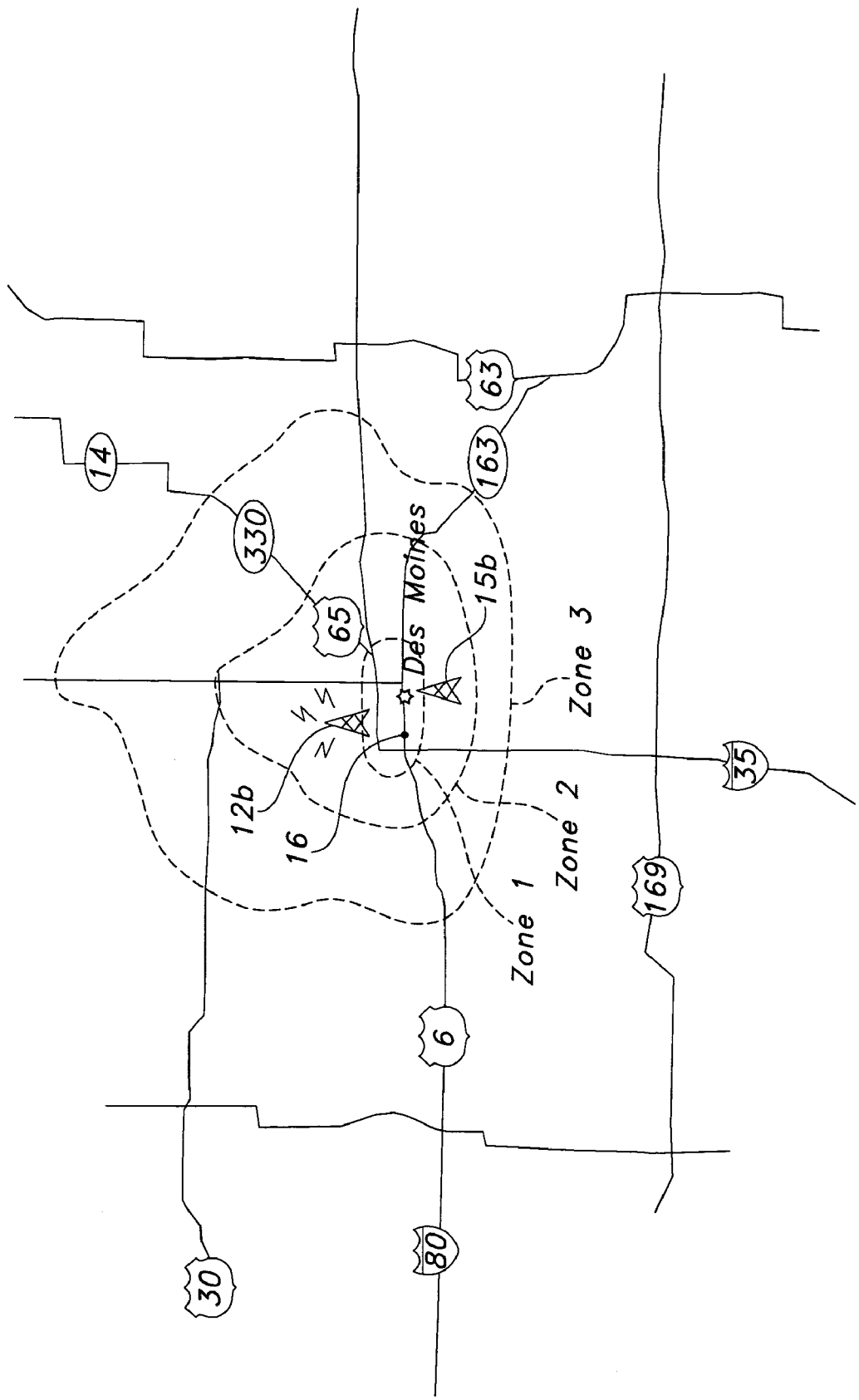
FIG. 3 shows operation of a forward error correction regulation system with the position of a mobile client being correlated to a historical bit error rate database for an area around Des Moines, Iowa.

Operation of the FEC is shown in FIG. 3 with the position of the mobile client 16 being correlated to the historical BER database for an area around Des Moines, Iowa. The unique broadcast FEC is dynamically constructed based on mobility status of the vehicle 16. A request for data from a vehicle 16 to the EOC 13 through the LMRS 15 over antenna 15*a* includes vehicle 16 mobility parameters such as GPS position, speed, and time to optimally construct FEC strength in the server 22 for transmitting the response from DTV station 12*a* over antenna 12*b*. In FIG. 3 Zone 1 has a high fade rate due to city buildings and a strong FEC, interleave, or redundancy is used. In Zone 2 a medium fade rate exists with some buildings a vehicular blockage requiring a medium FEC and redundancy. Zone 3 has a low fade rate with high blockage due to hilly terrain requiring a strong interleave and redundancy. Furthermore, the FEC redundancy might be regulated to a higher strength while the vehicle 16 is moving and minimal strength while the vehicle 16 is approximately stationary as determined by the GPS sensor 20 and transmitted over the LMRS 15 back channel. The server 22 may also schedule in advance updated FEC methods for subsequent data payloads for anticipated position location of the mobile client 16 as the client moves. Transmit server software anticipates vehicle location in order to create an optimized interleave sequence for that area.

In contrast, the cellular phone industry and other radio makers use continuous channel measurements to regulate FEC. The difference is that the system 10 utilizing the FEC regulation system of the present invention is mostly broadcast and has no continuous channel in which to maintain continuous link quality measurements therefore a means for estimating it is needed.

With the optional database a RF fade/BER or other channel performance measurement database located in the EOC 13 is provided by a previous field survey of RF fade statistics in an area of interest and is used to generate an FEC method for the mobile client 16 in a geographic location and predictive modeling is used to assign FEC variations based on a RF reception history model for that location and mobile client 16 predicted forward motion. Absolute GPS or received GIS data may automatically be used and attached to the vehicle 16 data request, whereby the server 22 accepts the geolocation and by the RF fade/BER measurement database provides the appropriate FEC strength for that vehicle 16 at the GPS determined location.

In the generation and use of the RF fade/BER measurement database semi-permanent information is collected in a prior mobile BER field collection test. A city may be surveyed street by street of its fade, field strength statistics, BER or other channel performance statistic important in understanding the probability of receiving good data. Statistical fade conditions may be predicted based on the vehicle 16 position, apparent or planned direction, and speed while on a particular road based on what comes next in the table while going in a certain direction on the road. The solution may be simplified by the fact the vehicle 16 stays on the road and predictive computing need only solve for a simple one-dimensional solution. In contrast fading may be predicted by using adjacent measurements to an area not having been RF fade surveyed before. Each mobile client vehicle 16 may also incorporate a fade statistics table that is correlated to its position. The variable FEC regulation system may then regulate the data payload redundancy in the transmission, FEC coding rate, or use a temporal data interleave process that is regulated to nominal fade frequency conditions.

Collection of RF statistics over a geographic region may be manual or automated. A field survey of an area may be made with an automated system incorporated in the vehicle 16 consisting of the GPS receiver 20, DTV datacast receiver 19, a data demodulator, and measurement equipment allowing automated collection of DTV field strength and BER performance to create the semi-permanent database that is correlated to absolute geolocation (streets and highways, bridges, parking garages, etc.). The server 22 in association with the DTV station 12a may be used to transmit data sequences or random information that may be used to assess BER from data collected from mobile vehicles 16 with the automated system. Database tables are then maintained at the EOC 13 and may optionally be updated by mobile client vehicles 16 as they call in through the LMRS 15. Mobile client vehicles 16 may also accumulate historical RF fade and BER statistics based on position to improve the tables over time. This historical information may also be transmitted with a LMRS 15 request or by other means such as cellular phone or other radios. This history may be processed by the server 22 to further assess FEC needs.

Some DTV stations 12a have collected signal strength data for their geographic areas of signal coverage using equipment such as a Z Technology RF survey system. This data may be used for the field survey data or to augment the data. A RF signal strength system may be used to sample the DTV carrier.

With the FEC regulation system, FEC is obtained by packet payload redundancy, packet time spreading, and interleaving techniques known in the art. FEC strength may be varied by modifying the transmit payload redundancy and/or interleaving time intervals. Broadcast frame or packet sizes may also be selected based on conditions. Interleave time intervals may be non-equal in order to improve chances of delivering data in channels with varying fade conditions. FEC strength may be varied by changing the error coding rate (e.g. ½, ⅔ etc.) to best match the channel condition and to balance the need to conserve channel bandwidth. The variable FEC strength may be made related to seasonal foliage condition estimates and estimated conditions of wet foliage based on regional rain fall and evaporation rates.

FEC redundancy frequency may be regulated by GIS position location feedback taken from the vehicle 16 during the last contact or continuously. GPS position data may be used to compute line-of-sight or link loss when used with geographic information for that region. Redundancy frequency is defined by how often a packet is repeated. For example the location of the vehicle 16 may suggest that a redundancy of 6× is required such as in a heavy fading location in an urban area. The redundancy number is derived for a location based on signal-to-noise ratio (S/N) and/or BER measurements and includes the likely continued path of that vehicle 16.

The interleave characteristics may be selected based on the areas' fading statistics. For example a long or short interleave may be chosen based on vehicle 16 speed and location or predicted location. Additionally a variety of interleave time spans may be concatenated to produce an effect that improves received BER in an area having a variety of fade mechanisms. Fades that historically occur rapidly over time require a shorter interleave time period. Fades that occur more slowly signal the server 22 to select a shorter time interleave for the data stream. Fade situations that are occurring relatively longer and more frequently direct the server 22 at the EOC 13 to use more redundancy along with the interleave.

Position location systems that may be used in the asymmetric communications system 10 may include GPS, inertial navigation, MEMS (micro electromechanical system) sensors, RF position tags (such as disclosed in U.S. Pat. No. 5,990,826 and No. 6,188,353 both entitled "Interbuilding and Urban Canyon Extension Solution for Global Positioning Systems" by James P. Mitchell and both assigned to the assignee of the present invention), gyros, ring laser gyros, and other TDOA (time difference of arrival) systems including systems that are part of another network such as cellular, 3-G, cell phone TDOA (time difference of arrival) systems, E-911, broadband, and UWB (ultra wideband communications and navigation systems). These and other systems or future positioning systems may be used alone or in hybrid fashion in order to improve position location accuracy and thereby accuracy of the asymmetric communications system 10 of the present invention.

All position locations referenced herein may optionally employ IPv6 (Internet Protocol Version 6) addressing, where addressing may be correlated (assigned) based on users position, region, and locale to a broadband service. IPv6 employs greater capacity to assign IP addresses to areas including mobile applications. Position location may determine the FEC that is used and also be used as a means for assigning an IP address for a broadband service nearby or alternatively as part of any position location RF tag or device.

Position location information delivered to the DTV broadcast system 12 may be used to select the encoding rate of H.2xx, MPEG-2 and MPEG-4 video. The RF statistics for a given geolocation position may provide RF statistics that an algorithm uses to select the video encoding rate for the mobile client 16. If the RF statistics are relatively good then a MPEG-2 video rate is selected to match that channel condition (4 Mbps) and is encapsulated in a FEC, and interleaved to fit channel conditions. It is noted that these levels are well published by radio and encoder equipment vendors and described in video coding texts.

There is a difference between commercial and government use of the system 10 in that a territory of operation is may not be friendly to make a preliminary RF survey. In this case propagation models must be used to estimate the link margin given computed interference (e.g. hill blocking DTV station 12a and vehicle 16 from direct line-of-sight). A digital terrain map (3-D) with elevations is captured or provided from the map database. Position data from a roving vehicle 16 is also captured. Based on propagation models a FEC method is selected and modified on a ongoing basis or as needed or based on empirically collected RF bit-error-rate data from the region by others having already been in the area or by earlier survey.

It is believed that the variable rate forward error correction based on position location information of the present invention and many of its attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A method, comprising:
   regulating forward error correction (FEC) in a communications network having asymmetric channels that receives requests for wideband data from a mobile client over a LMRS (Land Mobile Radio Service) narrowband channel and delivers wideband data to the mobile client over a wideband channel, comprising:
   regulating FEC strength as a function of a mobile client location and channel statistics for the mobile client location, wherein the FEC strength is higher while the mobile client is moving and minimal while the mobile client is approximately stationary;
   varying FEC strength by modifying interleave characteristics based on mobile client speed and location or predicted location;
   regulating FEC strength at least in part on measured fade statistics of the location or the predicted location; and
   surveying, in advance of the mobile client reaching the location and the predicted location, the location and predicted location of the mobile client to gather the measured fade statistics to determine needed FEC strength.

2. The method of regulating FEC of claim 1 further comprising the steps of:
   regulating FEC within a server;
   storing historical channel data for locations of the mobile client in a channel statistics database; and
   providing geographic location data with a map database connected to the server.

3. The method of regulating FEC of claim 1 further comprising the step of using mobile client position determined from a GPS receiver and transmitted with the request.

4. The method of regulating FEC of claim 1 further comprising the step of regulating FEC strength as a function of mobile client position or predicted position and channel performance statistics measured by the mobile client over a period of time and sent to the server with data requests.

5. The method of regulating FEC of claim 1 further comprising the step of regulating FEC strength as a function of mobile client position or predicted position and channel performance statistics previously collected and stored in a channel statistics measurement database for the mobile client position or predicted position.

6. The method of regulating FEC of claim 1 further comprising the step of cross referencing mobile client position with a predetermined measured performance for a location for FEC regulation.

7. The method of regulating FEC of claim 1 further comprising the step of varying the FEC strength by modifying packet payload redundancy.

8. The method of regulating FEC of claim 1 further comprising the step of varying FEC strength by changing an error coding rate to match the channel condition and to conserve channel bandwidth.

9. The method of regulating FEC of claim 1 further comprising the step of varying FEC strength by varying FEC redundancy frequency.

10. The method of regulating FEC of claim 1 wherein the FEC strength is varied by modifying Interleave time intervals to be non-equal.

11. The method of regulating FEC of claim 1 wherein the FEC strength is varied by modifying interleave characteristics based on mobile client speed and location or predicted location determined through GPS or augmented geolocation reporting.

* * * * *